2,999,963
DRY RECTIFIER OF SMALL TYPE
Heinz Schneider, Berlin-Haselhorst, Germany, assignor to Siemens-Schuckertwerke Aktiengesellschaft, Erlangen, Germany, a corporation of Germany
Filed July 12, 1960, Ser. No. 42,255
Claims priority, application Germany July 22, 1959
6 Claims. (Cl. 317—234)

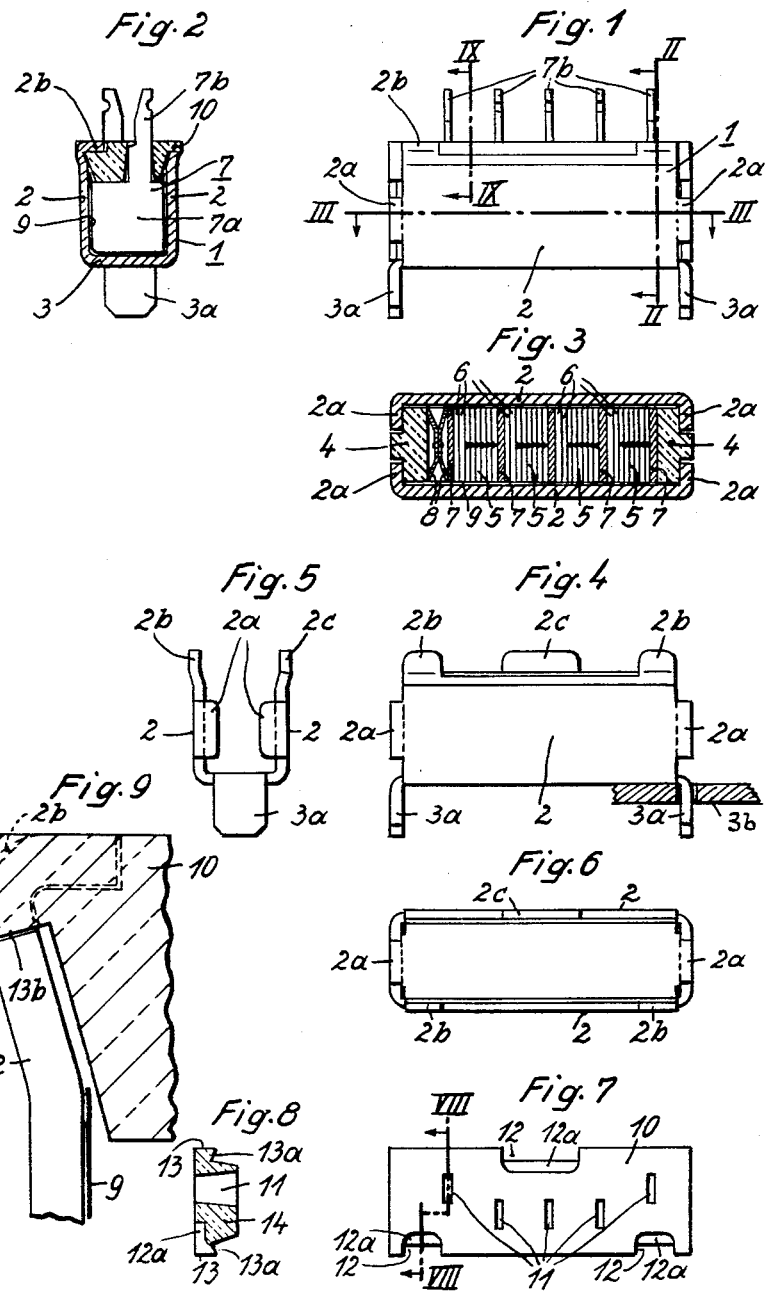

My invention relates to dry rectifiers of small or midget type, and more particularly, to rectifiers in which a stack of imperforate rectifier elements or tablets and connecting plates are disposed in a metal housing of U-shape cross section so that the edges of the rectifier elements will tightly rest against the housing walls, being insulated therefrom only by intermediate inserts of insulating material, for the purpose of dissipating the heat generated in the elements to the metal housing. A known device of this type has the housing closed by a cover likewise consisting of metal and insulated by an insert from the rectifier stack, the cover plate having bent-down edges which pass over the adjacent edges of the housing wall and are fastened to the housing by lugs bent over the cover plate.

When assembling such a rectifier device, the pressure required for bending the housing lugs that attach the cover plate may cause damage to the sensitive rectifier elements of the enclosed stack thus resulting in an undesirably large number of rejects.

It is an object of my invention to improve the design and assembly work so as to eliminate the above-mentioned deficiency of metal-enclosed midget rectifiers of the above-mentioned type.

To this end, my invention is predicated upon the design of a dry rectifier having a stack composed of imperforate rectangular rectifier elements or tablets and similarly shaped electrode or connecting plates, the stack being enclosed on three sides by a metallic housing of U-shaped cross section whose interior is lined or coated with insulating material, and which is closed by means of a cover plate located on the forward side of the stack and fastened by means of bent lugs consisting of extensions of the housing wall. Relating to such a rectifier, and in accordance with a feature of my invention, I provide the cover plate with flange-like side portions which are placed upon the edges of the housing walls and whose middle portions protrude into the space between the housing walls so as to constitute respective spacer numbers.

According to another and preferred feature of my invention, the side walls of the housing have their upper marginal portions bent outwardly to bevel shape, and the cover plate is given a mating bevelled shape, so that the above-mentioned side portions possess shoulder faces which are outwardly and downwardly inclined and is in contact with the edges of the housing where the device is in assembled condition. As a result, and as will be shown below with reference to the drawing, the latter feature results in an undercut design of the housing, and of the cover plate, which secures a reliable mutual anchoring of both components. The cover plate is preferably made of insulating material, it may be produced for example from suitable synthetic plastics by casting or injection molding.

The above-mentioned and more specific objects and features of my invention, said features being set forth with particularity in the claims annexed hereto, will be apparent from, and will be described as follows with reference to a preferred embodiment of a rectifier constructed in accordance with my invention, and illustrated on the accompanying drawings in which:

FIG. 1 is a side view of a dry rectifier according to the invention.
FIG. 2 is a cross section on the line II—II of FIG. 1.
FIG. 3 is a longitudinal section in plan view, along the line III—III in FIG. 1.
FIG. 4 is a side view, FIG. 5 a front view and FIG. 6 a top view of the metal housing, the rectifier stack and the cover being removed.
FIG. 7 is a top view of the cover plate, and FIG. 8 a cross section along the line VIII—VIII in FIG. 7.
FIG. 9 illustrates, on a large scale, the junction between housing and cover plate.

As is apparent from FIGS. 1 to 3, the dry rectifier comprises a metal housing 1 of U-shape cross section, having side walls 2 and a bottom wall 3. The bottom 3 is provided with lugs 3a which are bent downward at a right angle to the plane of the bottom and which serve as twisting lugs for fastening the dry rectifier to a carrier structure, for example the metal chassis of an electric device or appliance. A portion of such a carrier structure is schematically shown in FIG. 4 at 3b. The carrier is provided with slots to be traversed by the fastening lugs 3a. Upon bending the lugs to the shape shown in FIG. 4, the bottom plate 3 is pulled tight against the carrier 3b, so that good heat-conducting contact is obtained between the bottom plate 3 and the carrier structure 3b, for the purpose of effectively dissipating heat originating in the rectifier stack through the metal housing of the rectifier, to the carrier plate and the environment.

Each of the two side walls 2 of the housing has two extensions 2a (FIG. 4) on opposite sides respectively. These extensions constitute flange-like lugs, and are bent at a right angle inwardly to form an abutment for two insulating plates 4 (FIG. 3) which form the lateral closures of the housing. Disposed between the two insulating plates 4 is a stack composed of selenium rectifier elements or plates 5, and connector plates 7 of copper. If necessary additional blind plates or metallic filler pieces 6 may also be inserted. These stack elements have rectangular or square shape (FIG. 2). The stack further comprises one or more elastic members 8 for maintaining the stack under the necessary contact pressure. In the illustrated embodiment the members 8 consist of leaf springs. The power stack is insulated from the metal housing 1 by means of an insulating foil 9.

As is particularly apparent from FIG. 2, the connector plates 7 comprise a rectangular or square main portion 7a which forms part of the stack proper and has substantially the same size as the rectifier elements 5. Integral with each connector plate 7 is a flag or lug 7b which protrudes through the cover to the outside and constitutes a terminal of the rectifier device.

As shown in FIGS. 2 and 5, the lateral walls 2 have their upper marginal portions slightly bent or flaring outwardly. Above the bevelled portion thus provided along the upper edges of the side walls, each side wall has extensions 2b and 2c (FIG. 4) which serve as fastening lugs. One of the two side walls possesses two lugs 2b located at the respective two extremities of the wall, whereas the other side wall has a centrally located 2c (FIGS. 4–6).

After inserting the rectifier stack comprising the elements 5, 6, 7 and 8 into the housing, the latter is closed by a cover plate 10 separately illustrated in FIGS. 7 and 8. The plate 10 consists of insulating material. It is provided with slots 11 through which the terminal flags 7b pass from the stack to the outside. To facilitate the insertion of the terminal flags 7b into the slots 11, the slots are widened to a wedge-like shape on the bottom side of the plate 10 (FIG. 8). The cover plate 10 is further provided with recesses 12 and cavities 12a for receiving the respective fastening lugs 2b and 2c.

The cross-sectional shape of the cover plate, best apparent from FIG. 8, is so chosen that the plate forms two flange-like shoulder portions 13 and a slightly wedge-shaped middle portion 14. The faces 13a at which the lateral cover portions 14 rest upon the edges of the housing walls 2 (FIGS. 2, 8, 9) are inclined outwardly and downwardly from the main body of the cover thus being adapted to the edges of the outwardly bevelled marginal portions of the side walls 2.

The smallest width of the cover plate 10 at its wedge-shaped portion 14 is considerably smaller than the inner width of the housing between the two opposite housing walls 2 (FIG. 2). This has the effect that, when closing the housing by the cover, the insulating foil 9 will arrive at correct position without being bent or upset (FIG. 9).

As apparent from FIG. 9, when the cover plate 10 is inserted and the lugs 2b are bent over the cover, the edge of the housing wall 2 coacts with the inclined contact face 13a of cover 10 so as to form a swallow-tail junction between the housing wall 2 and the cover plate 10. Consequently when the assembly work is completed, the housing and the cover plate 10 are firmly and permanently secured together and cannot be loosened readily.

Before covering and closing the housing, as described above, the device is placed into a jig or recipient which closely surrounds the housing 1. The lugs 2b and 2c are then simultaneously bent inwardly. During this operation the necessary bending pressure imposes a stress exclusively upon the cover plate 10 but not upon any part of the inserted stack, especially the rectifier elements 5. As a result, any inadvertent damage to the stack and its components, heretofore virtually inevitable during manufacture of the device, is reliably obviated.

I claim:

1. A dry rectifier comprising a stack of rectangular rectifier elements and connector plates, which stack is enclosed at the bottom and two opposite sides by a metallic member of U-shaped cross section lined by insulation, a top cover plate which rests upon a fourth side of the stack, bent lugs formed as extensions of opposite side walls of said member and serving to fasten the cover plate, the cover plate having lateral flange portions which rest upon contact edge faces of said opposite side walls, the middle portion of the cover plate protruding into the space between the said opposite walls, and constituting a spacer piece, said opposite walls having upper marginal portions which are bent to flare outwardly and upwardly in an inclined direction, whereby the edge faces of the walls providing said contact faces extend in the outward and downward direction, the said middle portion of the cover plate being wedge-shaped and being inserted between the flared-out portions, so that, when said lugs are bent inwardly to fasten the cover, the bending pressure imposes a stress exclusively upon the cover plate but not upon the rectifier elements.

2. The device defined in claim 1, the cover plate being made of electrically insulating material.

3. A dry rectifier comprising a stack of rectangular rectifier elements and connector plates, which stack is enclosed at the bottom and two opposite sides by a metallic member of U-shaped cross section lined by insulation, a top cover plate which rests upon a fourth side of the stack, bent lugs formed as extensions of opposite side walls of said member and serving to fasten the cover plate, the cover plate having lateral flange portions which rest upon contact edge faces of said opposite side walls, the middle portion of the cover plate protruding into the space between the said opposite walls, and constituting a spacer piece, said opposite walls having upper marginal portions which are bent to flare outwardly and upwardly in an inclined direction, whereby the edge faces of the walls providing said contact faces extend in the outward and downward direction, the said middle portion of the cover plate being wedge-shaped, and being inserted between the flared-out portions, so that, when said lugs are bent inwardly to fasten the cover, the bending pressure imposes a stress exclusively upon the cover plate but not upon the rectifier elements, the cover plate being made of electrically insulating material and being formed with a plurality of apertures passing therethrough, the connector plates having extensions formed thereon which extend outwardly through said apertures, and form electrode connections for said rectifier.

4. A dry rectifier comprising a stack of rectangular rectifier elements and connector plates, which stack is enclosed at the bottom and two opposite sides by a metallic housing of U-shaped cross section lined by insulation, a top cover plate which rests upon a fourth side of the stack, bent lugs formed as extensions of opposite side walls of said housing and serving to fasten the cover plate, the cover plate having lateral flange portions which rest upon contact edge faces of said opposite side walls, the middle portion of the cover plate protruding into the space between the said opposite walls, and constituting a spacer piece, said opposite walls having upper marginal portions which are bent to flare outwardly and upwardly in an inclined direction, whereby the edge faces of the walls providing said contact faces extend in the outward and downward direction, the said middle portion of the cover plate being wedge-shaped and being inserted between the flared-out portions, so that, when said lugs are bent inwardly to fasten the cover, the bending pressure imposes a stress exclusively upon the cover plate but not upon the rectifier elements, the cover plate being made of electrically insulating material and benig formed with a plurality of apertures passing therethrough, the connector plates having extensions formed thereon which extend outwardly through said apertures, and form electrode connections for said rectifier, said two opposite side walls constituting the longitudinal walls of the housing, lugs formed on ends of said walls, two insulating bodies forming opposite end walls of the housing, said bodies each having an outwardly extending middle portion forming part of the outer end surfaces of the housing, the lugs being bent against the end portions of the outer faces of the bodies to form the outer end surfaces together with said middle portions.

5. A dry rectifier comprising a stack of rectangular rectifier elements and connector plates, which stack is enclosed at the bottom and two opposite sides by a metallic member of U-shaped cross section lined by insulation, a top cover plate which rests upon a fourth side of the stack, bent lugs formed as extensions of opposite side walls of said member and serving to fasten the cover plate, the cover plate having lateral flange portions which rest upon contact edge faces of said opposite side walls, the middle portion of the cover plate protruding into the space between the said opposite walls, and constituting a spacer piece, so that when said lugs are bent inwardly to fasten the cover, the bending pressure imposes a stress exclusively upon the cover plate but not upon the rectifier elements, the cover plate having a thickness such that it extends inwardly of the member a substantial distance to serve as stable fulcrum for said bending stress, said distance being not less than about a fifth of the inner depth of the said U-shaped cross section, and being not less than about a sixteenth of an inch, said rectifier elements being positioned transversely of the said metallic member.

6. A dry rectifier comprising a stack of rectangular rectifier elements and connector plates, which stack is enclosed at the bottom and two opposite sides by a metallic member of U-shaped cross section lined by insulation, said rectifier elements extending transversely of said member, a top cover plate which rests upon a fourth side of the stack, said cover plate extending transversely within said member beyond the transverse extent of said rectifier elements at both end faces of the latter, bent lugs formed as extensions of opposite side walls of said member and serving to fasten the cover plate, the cover plate having lateral flange portions which rest upon contact edge faces of said opposite side walls, the middle portion of the cover plate protruding into the space between the said opposite walls and constituting a spacer piece so that, when said lugs are bent inwardly to fasten the cover, the bending pressure imposes a stress exclusively upon the cover plate but not upon the rectifier elements.

References Cited in the file of this patent

UNITED STATES PATENTS 2,931,959   Parow _____ Apr. 5, 1960